United States Patent [19]

Murase

[11] Patent Number: 4,520,050
[45] Date of Patent: May 28, 1985

[54] FINISH COMPOSITION FOR POLYESTER FIBER FOR RUBBER REINFORCEMENT

[75] Inventor: Shigemitsu Murase, Joyo, Japan

[73] Assignee: Unitika Limited, Osaka, Japan

[21] Appl. No.: 533,011

[22] Filed: Sep. 16, 1983

[30] Foreign Application Priority Data

Dec. 29, 1982 [JP] Japan .................................. 57-234194

[51] Int. Cl.$^3$ .............................................. B05D 3/02
[52] U.S. Cl. ................................. 427/381; 156/330.9; 156/331.1; 156/336; 427/389.9; 524/597; 524/598
[58] Field of Search ............................... 524/597, 598; 156/330.9, 331.1, 336; 427/381, 389.9

[56] References Cited

U.S. PATENT DOCUMENTS 3,095,395 6/1963 Goodman ............................ 524/598
3,436,288 4/1969 Patterson ..................... 156/331.1 X

FOREIGN PATENT DOCUMENTS 301133 11/1928 United Kingdom ................ 524/597

Primary Examiner—Michael R. Lusignan

[57] ABSTRACT

This invention is a composition for polyester fiber for use in reinforcing, the finish composition being characterized by an oil portion containing a lubricant and 3–30 weight % of a melamine compound.

3 Claims, No Drawings

FINISH COMPOSITION FOR POLYESTER FIBER FOR RUBBER REINFORCEMENT

BACKGROUND OF THE INVENTION

This invention relates to a finish composition for polyester fiber for use in reinforcing rubber.

Polyester fiber, such as polyethylene terephthalate, has excellent physical and chemical properties, is mass produced industrially, and is used widely in many fields. It is a very suitable material for reinforcing rubber.

However, when compared with polyamide fibers such as nylon 6 and nylon 66, which are also typical industrial fibers, polyester fibers have a great shortcoming in that their adhesion to rubber is inferior.

In other words, polyamide fibers achieve very good adhesion to rubber simply by treating them with a resorcinol-formaldehyde rubber latex (RFL); in the case of polyester fibers, however, good adhesion cannot be achieved by this RFL treatment. Thus, in order to achieve high adhesion to rubber, it is necessary to carry out the parallel application of adhesive to the polyester either in the same bath as that for the RFL dip treatment or in another bath; the dip treatment requires a high temperature. High temperature causes decomposition and fuming of the finish composition; it also causes yarn properties to deteriorate which causes functional degradation and, thus a drop in the performance of the rubber products. Also, high temperature treatment wastes energy.

With this background, this invention provides a finish composition for polyester fibers for use in reinforcing rubber. Excellent adhesion to rubber is achieved at a dip treatment temperature which is 20°-30° C. lower than conventional treatment temperatures while satisfying the requirements of the oil portion in producing yarn.

SUMMARY OF THE INVENTION

Thus, the key to this invention is the finish composition for polyester fibers for use in reinforcing rubber. The composition is prepared by adding 3-30 weight % of a melamine type compound to an oil portion which contains a lubricant.

In this invention, the melamine compound means a melamine resin's initial condensation product and its intermediate (methylolated melamine, etc.). As the melamine resin, one can use melamine-formaldehyde resin, melamine resin acid colloid, urea-melamine-formaldehyde resin. Among these melamine compounds, one with a higher degree of reaction is preferable; but, even if one at an intermediate stage of reaction is used, it will react with the formaldehyde of the RFL during the dip treatment so that there is no great difference in choice.

The finish composition contains, in addition to the melamine compound, natural oils such as mineral oil, coconut oil, rapeseed oil, sperm oil or synthetic oils such as esters of higher alcohols or polyhydric alcohols and higher fatty acids, as the lubricant component; a surfactant which can emulsify and disperse the lubricant component; antistatic agents, heat-resisting agents, coloring agents, as needed. Depending on the composition, use of a surfactant as an emulsifying and dispersing agent is not necessarily required; if a surfactant is used, however, the following are preferred: a compound in which alkylene oxide has been added to castor oil or a higher alcohol; an ester of polyethylene glycol and a higher fatty acid.

The following proportion of components in the finish composition is preferred: melamine compound 3-30 weight %; lubricant 20-70 weight %; emulsifier 10-50 weight %; and suitable quantities of other additives so that the total will be 100 weight %. As for the amount of the melamine compound, 3-30 weight % is required. If less than 3 weight % is added, its effect is not achieved; conversely, if more than 30 weight % is added, the dipped cord becomes hard, adversely affecting the subsequent vulcanization process and causing a drop in the performance of the rubber product.

If the proportions of the mixture are within these ranges, the inherent lubricating function of the oil portion in producing yarn is not lost and the desired adhesion will be obtained, even when the dip treatment temperature is 20°-30° C. below conventional temperatures.

The "polyester" of this invention refers to a polycondensation product of a compound having two ester-forming OH groups, as typified by ethylene glycol, and a compound having two ester-forming carboxyl groups, as typified by terephthalic acid. A typical example is polyethylene terephthalate. However, the polyester is not limited to homopolymers, and it can be a copolymer; the copolymer component can be a compound which contains more than three ester-forming groups, within a range that will not hinder the fiber-forming properties.

The finish composition of this invention can be applied at any step during production of the above-mentioned polyester fiber, e.g., as a spinning oil (spin finish composition) applied to the filaments by a roller after melt spinning and prior to winding up, and as an overfinish composition applied after drawing and before winding up. In the latter case, a small amount of the finish composition which was used as the spinning oil may remain. As for the amount of oil portion applied during yarn production, 0.3-2.0% with respect to the weight of the fiber is preferable.

Needless to say, there are no restrictions, in this invention, on the molecular weight of the polyester fiber, denier, number of filaments, cross-sectional shape, physical properties of the yarn, microstructure, presence or absence of additives, polymer properties (such as the carboxyl end group concentration).

DESCRIPTION OF THE PREFERRED EMBODIMENT

The invention is explained in further detail by use of the following examples of application.

In the examples of application, measurement of the intrinsic viscosity was carried out at 20° C. in a mixed solvent of phenol-tetrachloroethane (1:1 weight ratio).

Evaluation of the adhesive force to rubber was carried out by the following method. The sequence of this method was: yarn→griege cord (twisting, joining)→dip cord (dip treatment)→embed in rubber and vulcanize→ measure the adhesive force between the rubber and cord.

Here, preparation of the griege cord was carried out by use of a ring twisting machine at 40 twists/10 cm; two of these cords were joined in the same manner at 40 twists/10 cm. Dip treatment was carried out under the following conditions:

| Dip Liquid | Parts |
| --- | --- |
| Resorcinol-formaldehyde-Gentac latex | 83 |

| Dip Liquid | Parts |
| --- | --- |
| type RFL dispersion (Ratio of the solid content 16.6-5.4-100, pH was adjusted to 9.5 by NaOH; total solid content 20%) | |
| Pexul | 17 |
| Total | 100 |

Gentac latex is the trade name of General Tire and Rubber Company for the butadiene-styrene-vinyl pyridine ternary polymer latex. Pexul is the trade name of ICI Company for the 20% ammonia-water solution of 2,6-bis(2′,4′-dihydroxyphenylmethyl)-4-chlorophenol.

| Dip Condition | |
| --- | --- |
| Drying zone | 80° C. × 30 seconds |
| Curing zone | 220° C. × 80 seconds × 2 times |

Method of vulcanization was as follows: In an H-test mold, the dipped cord was buried (embedded) in the unvulcanized rubber, the components of which were smoked sheet 30 parts, styrene-butadiene rubber 70 parts, carbon black 40 parts, zinc oxide 5 parts, stearic acid 1.5 parts, phenyl-beta-naphthyl amine 1 part, phthalic anhydride 0.3 part, vulcanization accelerator 0.8 part, diphenyl guanidine 0.15 part, and sulfur 2 parts. Vulcanization under pressure was done for 40 minutes at 140° C. This was the method for adhesive treatment.

Measurement of the adhesive force was done by the H-test method, i.e., the method of measuring the load required to pull out a cord from a depth of 1 cm in rubber.

EXAMPLE OF APPLICATION, 1

Terephthalic acid and ethylene glycol were polymerized by a conventional method to obtain polyethylene terephthalate (PET) having an intrinsic viscosity of 0.95. This was spun by use of an extruder-type melt spinning machine. The yarn was then drawn by use of a drawing machine which was equipped with a 230° C. heater plate. Thus, PET yarn of 1500 denier, 192 filaments was produced. In making this yarn, just before winding the spun, undrawn yarn up, the five types of spinning oil portions listed in Table 1 were applied as an aqueous emulsion (effective oil components 20%) so that the amount of final effective oil component is 0.7–0.8% with respect to the fiber weight. Thus, five PET yarns with different finish compositions were obtained.

The PET yarn obtained was dip-treated at 220° C. and the adhesive force to rubber was measured. Results are shown in Table 2.

TABLE 1

| Number | 1 | 2 | 3 | 4 | 5 |
| --- | --- | --- | --- | --- | --- |
| Oleyl Oleate | 60 | 50 | — | 40 | — |
| Rapeseed Oil | — | — | 40 | — | 30 |
| POE (20) Castor Oil | 20 | 20 | 30 | 30 | — |
| POE (12) Hardened Castor Oil | 15 | 15 | — | 5 | 20 |
| PEG (600) Monooleate | — | — | 10 | — | 10 |
| Melamine Compound A | — | 10 | 20 | — | — |
| Melamine Compound B | — | — | — | 20 | 40 |
| Dioctylsulfosuccinate.Na Salt | 5 | 5 | — | 5 | — |
| Total | 100 | 100 | 100 | 100 | 100 |

NOTES:
(1) POE means polyoxyethylenation and the number in parentheses indicates the number of moles added.
(2) PEG means polyethylene glycol and the number in parentheses indicates its molecular weight.
(3) Melamine Compound A is a melamine-formaldehyde resin with the trade name of Smitex Resin M-3 (made by Sumitomo Chemical Company), and melamine Compound B is hexamethylol melamine.
(4) Ratio of each component of the oil agent is given in weight %.

TABLE 2

| Number | Adhesive Force (kg/cm) | Remarks |
| --- | --- | --- |
| 1 | 13.0 | Comparative example |
| 2 | 17.0 | Example of this invention |
| 3 | 17.4 | Example of this invention |
| 4 | 17.5 | Example of this invention |
| 5 | 16.3 | Comparative example |

As is seen from Table 2, No. 2–4, which are the examples of this invention, clearly have superior adhesive force in comparison to No. 1 which is a conventional finish composition. Comparative example 5 contained 40 weight % of melamine compound; the drawing operation went poorly because of too much melamine compound, and the dipped cord was too hard. Thus, high adhesive force could not be obtained due to insufficient strength.

EXAMPLE OF APPLICATION, 2

PET chips of intrinsic viscosity 0.90 were melt spun by use of an extruder-type melt spinning machine. Using a roller type oil applicator, application of a nonaqueous finish compostion was made by 0.2% per fiber weight; the finish composition had the following composition: low viscosity mineral oil 40 weight %, isostearly oleate 20 weight %, glycerine dilaurate 10 weight %, POE (6) cetyl alcohol 20 weight %, POE (10) stearyl amine 5 weight %, sodium salt of dioctyl sulfosuccinate 5 weight %. Without winding up, the yarn was led to a multistage drawing device in which heated rollers and separator rollers were used and the yarn was drawn. After drawing and just prior to winding up, No. 1 oil portion, No. 2 oil portion of Example 1 were applied by 0.7 weight % to obtain PET yarns No. 6 and No. 7, respectively, of 1500 denier and 192 filaments. In this case, the actual amount of finish composition which was applied at the first stage was 0.1 weight % and the total amount of finish composition was 0.8 weight %.

For the two types of PET yarns thus obtained, the adhesive treatment was performed in the same manner as in Example 1. As a result, the adhesive force to rubber was 13.0 kg/cm for No. 6, and 16.5 kg/cm for No. 7. Thus, it is seen that Example No. 7 of this invention had greatly improved adhesive force.

We claim:

1. A method of producing polyester fiber with improved adhesion to rubber comprising:
   (a) applying to the fiber a finish composition comprising an effective amount of lubricant and about 3 to 30 weight percent of the initial condensation product and its intermediate of a melamine resin;
   (b) forming the treated fiber into cord;
   (c) dipping the cord in a bath comprising a resorcinol-formaldehyde-latex;
   (d) drying the cord; and
   (e) curing the cord at a temperature of about 220° C.

2. The method of claim 1 wherein the lubricant is present in an amount of 20 to 70 weight percent of said composition.

3. The method of claim 2 wherein the composition additionally comprises a surfactant in an amount of 10 to 50 weight percent.

* * * * *